(12) United States Patent
Yoshida et al.

(10) Patent No.: US 6,179,936 B1
(45) Date of Patent: Jan. 30, 2001

(54) METHOD FOR HEAT-TREATING A HOLLOW CYLINDRICAL WORKPIECE

(75) Inventors: Isao Yoshida; Kimio Goto, both of Chigasaki; Hiroyuki Takeno, Hiratsuka; Masahiro Nakajima, Tokyo, all of (JP)

(73) Assignee: Topy Kogyo Kabushiki Kaisha, Tokyo (JP)

(*) Notice: Under 35 U.S.C. 154(b), the term of this patent shall be extended for 0 days.

(21) Appl. No.: 09/238,610

(22) Filed: Jan. 28, 1999

(30) Foreign Application Priority Data

| Jan. 29, 1998 | (JP) | 10-016492 |
| Dec. 24, 1998 | (JP) | 10-367639 |
| Jan. 6, 1999 | (JP) | 11-001010 |

(51) Int. Cl.[7] ............ C21D 1/10; C21D 1/42; C21D 9/08
(52) U.S. Cl. .................... 148/570; 148/594
(58) Field of Search .................... 148/594, 570, 148/520

(56) References Cited

U.S. PATENT DOCUMENTS

| 4,165,246 | * | 8/1979 | Reinke et al. | 148/150 |
| 4,210,468 | * | 7/1980 | McGee | 148/12.4 |
| 5,249,868 | * | 10/1993 | Watts | 384/276 |

FOREIGN PATENT DOCUMENTS

| 59-77979 | 5/1984 | (JP) . |
| 64-75629 | 3/1989 | (JP) . |
| 5-078745 | * 3/1993 | (JP) . |
| 5-078746 | * 3/1993 | (JP) . |
| 9-143564 | 6/1997 | (JP) . |

* cited by examiner

*Primary Examiner*—George Wyszomierski
*Assistant Examiner*—Janell Combs Morillo
(74) *Attorney, Agent, or Firm*—Pillsbury Madison & Sutro LLP (57) ABSTRACT

A method for heat-treating a hollow cylindrical workpiece includes quench-hardening including a first step and a second step. In the first step, during continuously conveying the workpiece in a horizontal direction without a space between adjacent workpieces, an entirety of the workpiece is subjected to induction-heating conducted from an outside surface of the workpiece only, and a temperature of the workpiece is made uniform before the workpiece reaches a cooling portion spaced from a heating portion. Then, cooling the workpiece is initiated before the temperature of the workpiece falls to $Ar_3$ temperature and an entire cross-section of a wall of the workpiece is quench-hardened. In the second step, during continuously conveying the workpiece in the horizontal direction, induction-heating is conducted only to an outside portion of the workpiece, the induction-heating being conducted from the outside surface only. Immediately after that, the workpiece is cooled from the outside surface thereby re-quench-hardening the outside portion, so that both the outside portion and the inside portion of the workpiece have a hardness greater than an effective hardness, and a core portion of a wall of the workpiece has a hardness less than the effective hardness.

10 Claims, 7 Drawing Sheets

DIRECTION OF MOVEMENT OF WORKPIECE

(FIRST STEP)　　　　　(SECOND STEP)

METHOD FOR HEAT-TREATING A HOLLOW CYLINDRICAL WORKPIECE

This application is based on Japanese Patent Applications HEI 10-16492 filed on Jan. 29, 1998, HEI 10 - 367639 filed on Dec. 24, 1998 and HEI11-1010 filed on Jan. 6, 1999, the content of which is incorporated into the present application by reference.

BACKGROUND OF THE INVENTION

1. Field of the Invention

The present invention relates to a method for heat-treating a hollow cylindrical workpiece. The hollow cylindrical workpiece includes, for example, a bushing which is one of members used for an endless track mounted to construction vehicles, but the hollow cylindrical workpiece is not limited to the bushing only.

2. Description of Related Art

For a hollow cylindrical work such as a bushing used for an endless track, hardness is required at an inside surface, an outside surface, and portions adjacent thereto so as to ensure a high wear resistance, and toughness is required at a core portion of a wall so as to prevent cracks from propagating from the surfaces.

Figure 6:
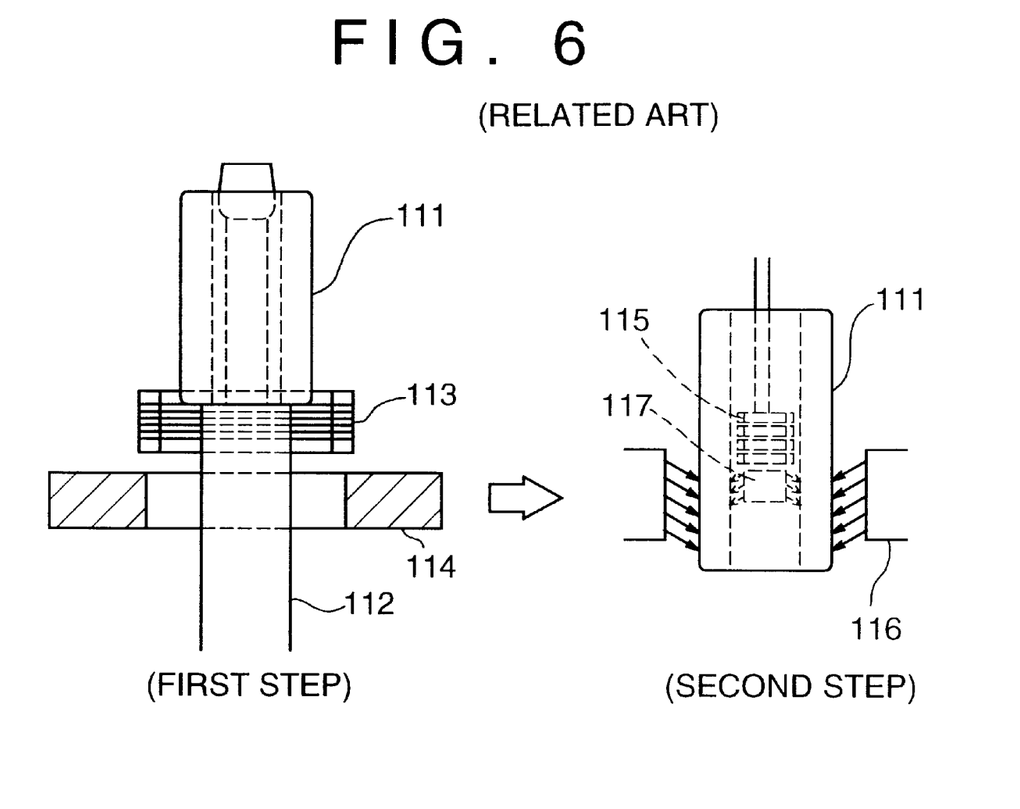
FIG. 6 is a cross-sectional view of an apparatus for conducting a first step and a second step according to a heat-treatment method as disclosed in Japanese Patent Publication No. SHO 59-77979.

In order to satisfy those two quality requirements at the same time, the following heat-treatment methods have been proposed:

(1) A method as proposed in Japanese Patent Publication No. SHO 59 - 77979, as illustrated in FIG. 6, includes a first step in which a workpiece 111 is subjected to high-frequency quench-hardening from an outside surface of the workpiece 111 to a part of an inside effective quench-hardened layer, and a second step in which, after the first step, an inside portion of the workpiece 111 is subjected to high-frequency quench-hardening, while a core portion of a wall of the workpiece 111 is tempered.

In FIG. 6, a reference numeral 112 denotes a tool for setting a workpiece, reference numeral 113 denotes a heating coil, reference numeral 114 denotes a cooling jacket, reference numeral 115 denotes a heating coil, and reference numerals 116 and 117 denote cooling jackets. In the first step, the workpiece 111 is conveyed in a vertical direction, and quench-hardening is conducted by heating the workpiece 111 from the outside surface, followed by cooling the workpiece 111 from the outside surface. In the second step, the workpiece 111 is conveyed in a vertical direction, and quench-hardening is conducted by heating the workpiece 111 from the inside surface, followed by cooling the workpiece 111 from the outside surface and from the inside surface at the same time.

Figure 7:
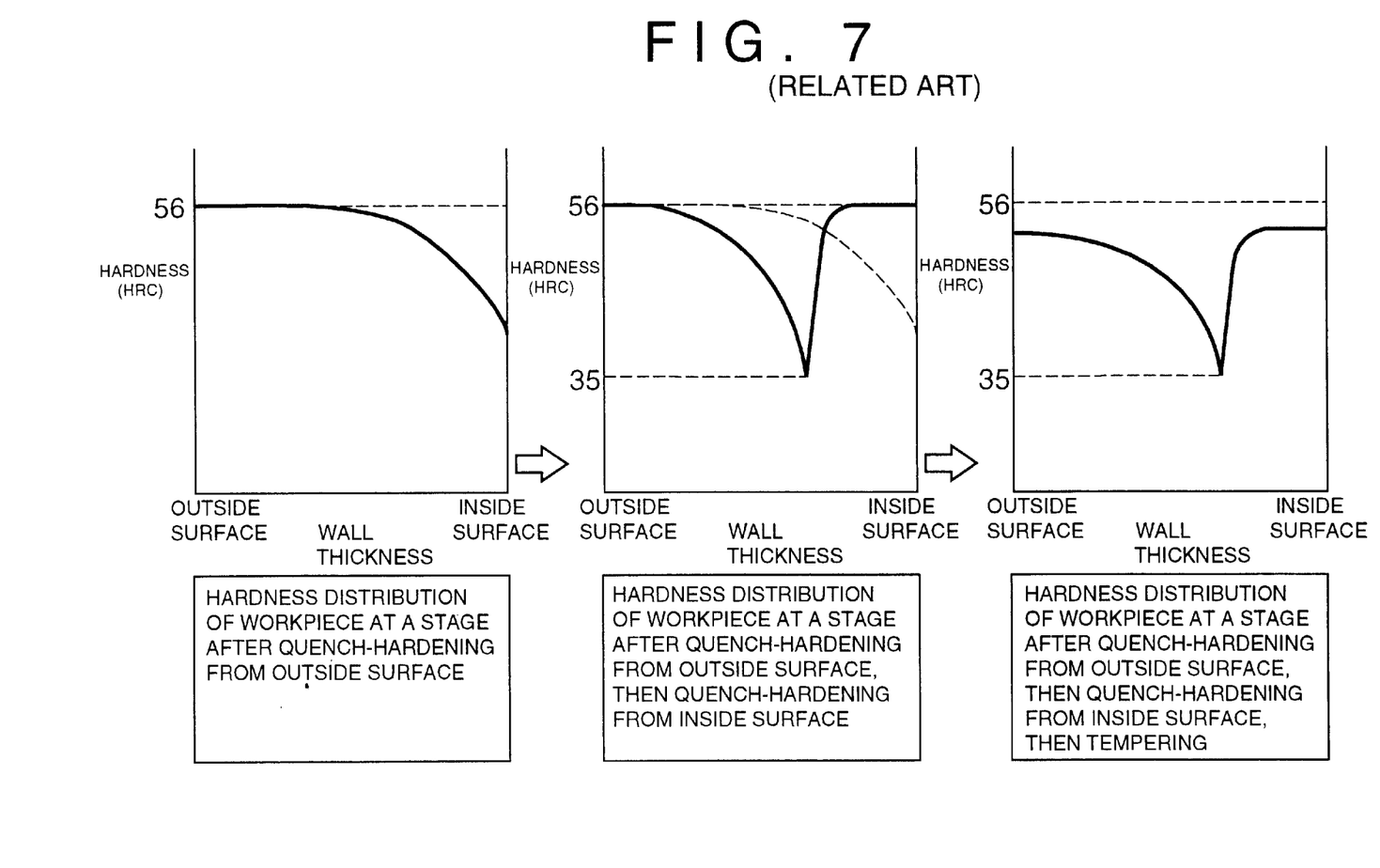
FIG. 7 is a graph illustrating a hardness distribution in a workpiece after each step has been conducted according to the method as disclosed in Japanese Patent Publication No. SHO 59-77979.

FIG. 7 illustrates a hardness distribution in the workpiece 111 after each step has been conducted.

Figure 8:
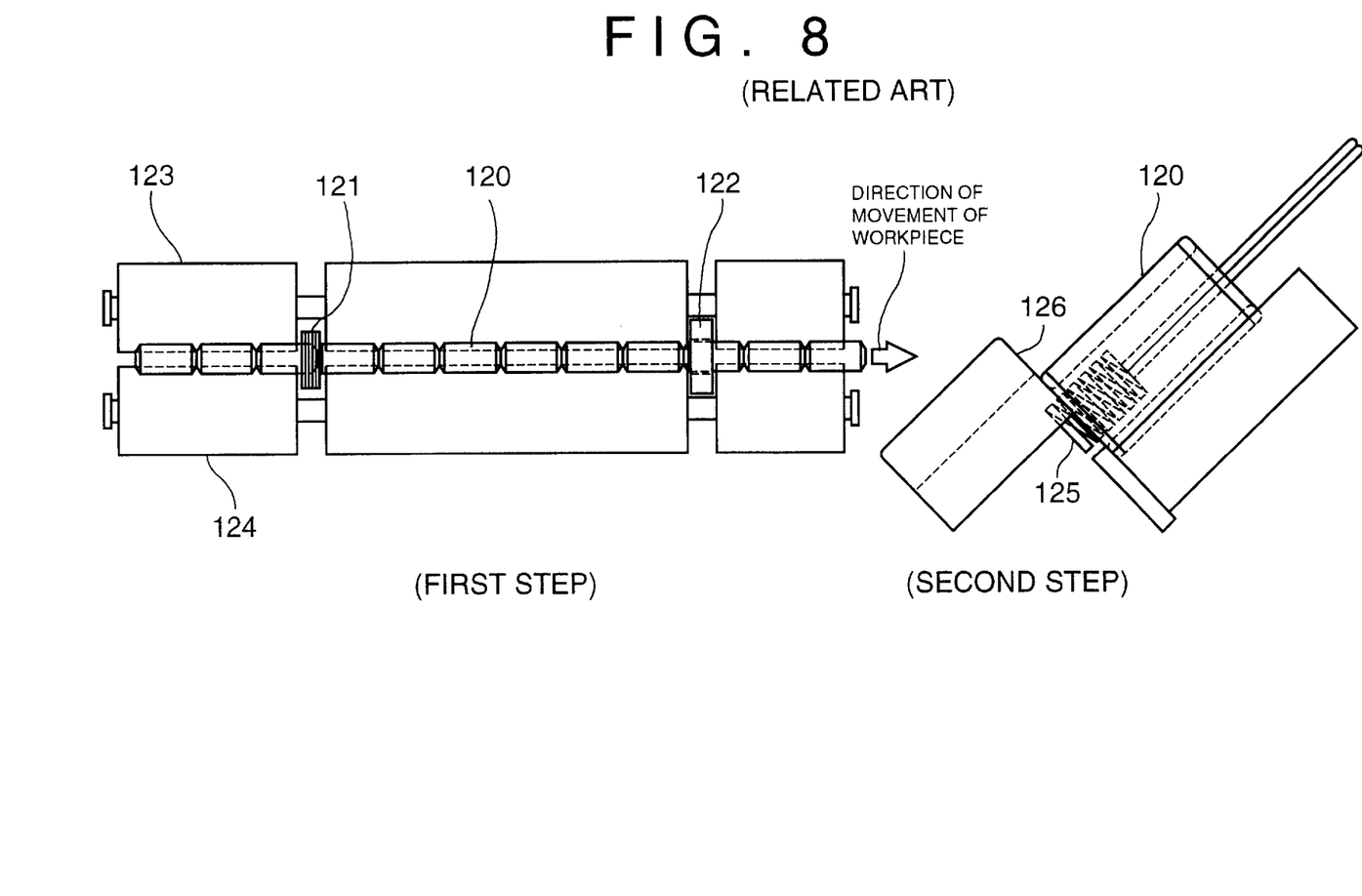
FIG. 8 is a plan view of an apparatus for conducting a first step and a second step according to a heat-treatment method as disclosed in Japanese Patent Publication No. HEI 9-143564.

(2) A method as proposed in Japanese Patent Publication No. HEI 9-143564 (Japanese Patent Application No. HEI 7-299997), as illustrated in FIG. 8, includes a first step in which high-frequency quench-hardening is conducted to an entire cross-section of a wall from an outside surface to an inside surface of a workpiece 120, and a second step in which, after the first step, an inside portion of the workpiece 120 is subjected to high-frequency quench-hardening, while a core portion of the wall is tempered.

In FIG. 8, reference numeral 121 denotes a heating coil, reference numeral 122 denotes a cooling jacket, reference numerals 123 and 124 denote rotatory rollers, reference numeral 125 denotes a heating coil, and reference numeral 126 denotes a cooling jacket. In the first step, the workpiece 120 is conveyed in a horizontal direction, and quench-hardening is conducted by heating the workpiece 120 from the outside surface, followed by cooling the workpiece 120 from the outside surface after a temperature of the workpiece 120 is made uniform, while the workpiece 120 is conveyed from the heating coil 121 to the cooling jacket 122 which are spaced from each other. In the second step, the workpiece 120 is conveyed in a vertical direction including an oblique direction inclined with respect to the vertical direction, and quench-hardening is conducted by heating the workpiece 120 from the inside surface, followed by cooling the workpiece 120 from the outside surface.

Figure 9:
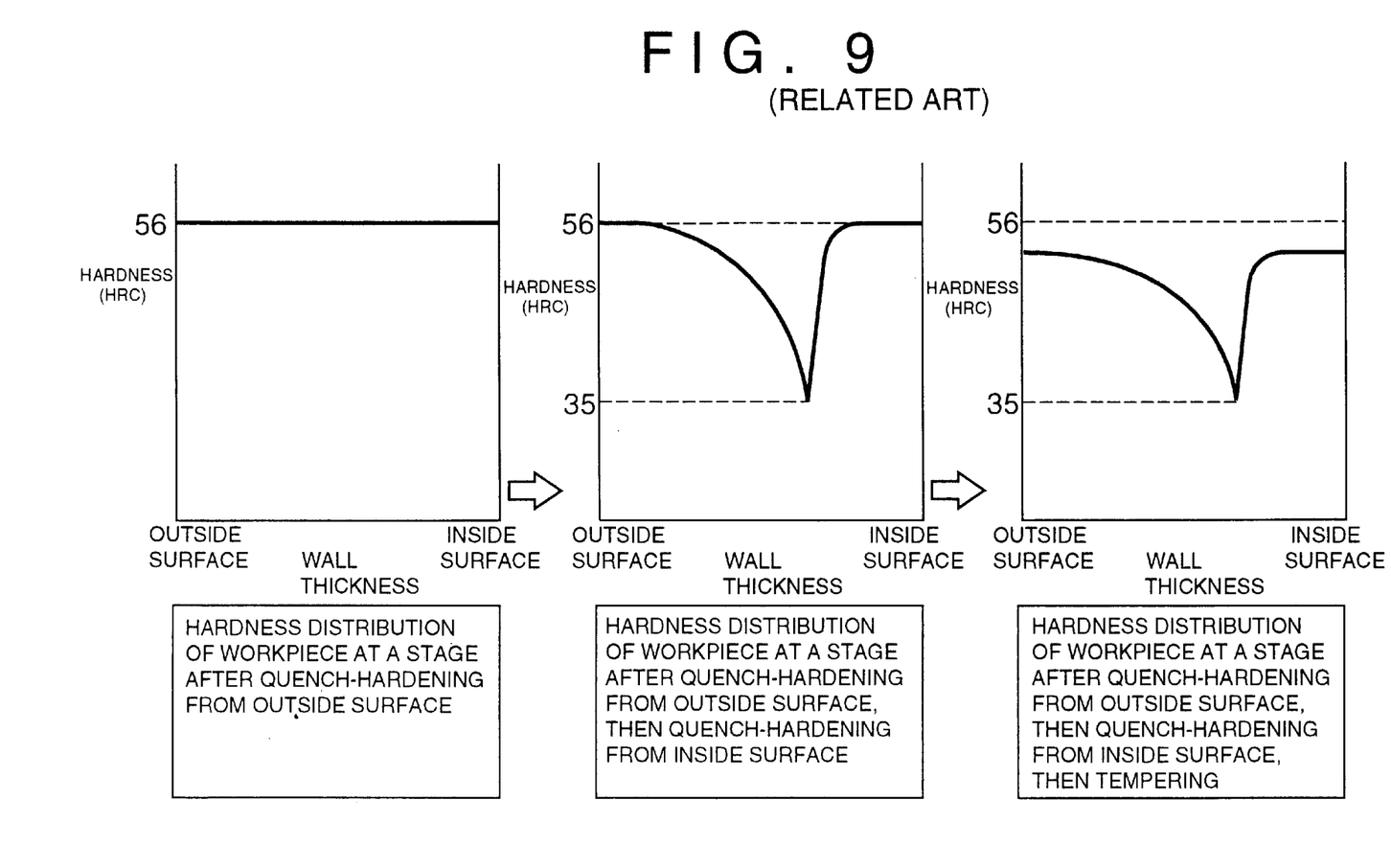
FIG. 9 is a graph illustrating a hardness distribution in a workpiece after each step has been conducted according to the method as disclosed in Japanese Patent Publication No. HEI 9-143564.

FIG. 9 illustrates a hardness distribution in the workpiece 120 after each step has been conducted.

(3) A method as proposed in Japanese Patent Publication No. HEI 1-75629 includes a first step in which high-frequency quench-hardening is conducted to an entire cross-section of a wall from an outside surface to an inside surface of a workpiece, and a second step in which after the first step, while an inside portion of the workpiece is cooled, the workpiece is high-frequency quench-hardened from the outside portion, and a core portion of the wall is tempered.

In the second step, a cooling jacket is inserted within an inside surface of the workpiece so as to cool the inside portion of the workpiece.

However, in the above conventional methods, it is not possible to conduct a continuous heat-treatment in an integrated line including the first step and the second step.

More particularly, with the first conventional method (1), since the workpiece is conveyed in a vertical direction in both the first step and the second step, heat-treating the workpieces is not conducted continuously, but conducted intermittently one by one.

With the second conventional method (2), in the first step, the workpiece is conveyed in a horizontal direction, which enables a continuous heat-treatment in the first step. However, since the workpiece is conveyed in a vertical direction in the second step, heat-treating the workpieces is conducted intermittently one by one in the second step.

With the third conventional method (3), since the cooling jacket is inserted within the inside surface of the workpiece in the second step, heat-treating the workpieces is conducted intermittently one by one.

Accordingly, the above conventional methods have the following problems:

(a) A total cycle time is determined by a cycle time of the intermittent heat-treatment step, so that productivity is not further improved beyond that.

(b) A handling apparatus for inserting the heating coil and the cooling jacket within the inside surface of the workpiece needs to be provided, resulting in an increase in an initial cost.

(c) Since a temperature difference is caused between opposite end portions and a central portion of an entire length of the workpiece in the intermittent heat-treatment, the magnitude of deviation in a dimension of the workpiece after heat-treatment is increased.

SUMMARY OF THE INVETION

An object of the present invention is to provide a method for heat-treating a hollow cylindrical workpiece which enables continuous heat-treatment conducted in an integrated line.

In the method of the above-described object, the hollow cylindrical workpiece has an outside surface and an inside surface, which jointly define the outer and inner surface of a wall. The wall has an outside portion defined between the outside surface and a position spaced from the outside surface by a distance greater than one fourth of a thickness of the wall and less than one half of a thickness of the wall. An inside portion is defined between the inside surface and a position spaced from the inside surface by a distance less than one half of a thickness of the wall, and a core portion defined between the outside portion and the inside portion.

The above-described object is achieved with the method of quench-hardening. In a first step of quench-hardening, a workpiece is continuously conveyed, one workpiece after another in a substantially horizontal direction without a space between adjacent workpieces. While the workpieces are being continuously conveyed one after the other, they are simultaneously induction-heated across an entire cross-section of the wall of the workpiece to a temperature equal to or higher than an $Ac_3$, transformation temperature and equal to or lower than a temperature 200° C. higher than the $Ac_3$ transformation temperature, but only from the outside surface of the workpiece. The temperature of the workpiece is made substantially uniform in a longitudinal direction and in a thickness direction of the workpiece by using the time required to move the workpiece to a cooling portion spaced from the heating portion. Before the temperature of the workpiece falls to an $Ar_3$ temperature, cooling of the workpiece from only the outside surface is initiated, so that the entire cross-section of the wall of the workpiece is quench-hardened.

In a second step, the workpiece, which has the entire cross-section of the wall quench-hardened, is again conveyed one after another without a space between adjacent workpieces in a horizontal direction. While the workpiece is being conveyed, the outside portion of the wall is induction-heated to a temperature equal to or higher than the $Ac_3$ transformation temperature and equal to or lower than a temperature 200° C. higher than the $Ac_3$ transformation temperature from the outside surface of the workpiece.

Immediately after heating, the workpiece is cooled from the outside surface of the workpiece only, so that the workpiece has an effective hardness at a first position located within the outside portion. A portion located between the first position having the effective hardness and the outside surface has a hardness greater than the effective hardness, and a portion located closer to the core portion than the first position having the effective hardness has a hardness less than the effective hardness.

The workpiece also has the effective hardness at a second position located within the inside portion. A portion between the second position having the effective hardness and the inside surface has a hardness greater than the effective hardness, and a portion located closer to the core portion than the second position having the effective hardness has a hardness less than the effective hardness.

This method results in several advantages. Since the workpiece is conveyed in a horizontal direction in the first step, like in the first step of the conventional method disclosed in Japanese Patent Publication No. 9-143564, one advantage is that a continuous heat treatment is possible. Another advantage is that in the second step neither a heating coil nor a cooling jacket needs to be inserted within an inside surface side of the workpiece. Further, due to the horizontal movement of the workpiece in the second step, continuous heat treatment is again possible.

When the workpiece is made from either carbon steel or carbon low-alloy steel, tempering may be conducted after the second step involving conveying, heating and cooling. When the workpiece is tempered, the hardness at the surface of the workpiece is decreased, but the toughness at the entirety of the workpiece is increased, so that the workpiece may be put to practical use.

If tempering is conducted, the tempering may include heating within a furnace. Heating within a furnace during tempering allows for the entire cross-section of the wall of the workpiece to be heated to a uniform temperature. The heating temperature during heating within the furnace may be in the range of 150–250° C. or may be in the range of 400–700° C. When the workpiece is tempered in the lower range temperature of 150–250° C., the hardness obtained during the quench-hardening is hardly decreased and a necessary wear resistance is ensured. When the workpiece is tempered in the higher range temperature of 400–700° C., a good toughness can be ensured.

The workpiece may be made from either carbon steel and carbon low-alloy steel. When the workpiece is made from either carbon steel and carbon low-alloy steel, the tempering may include induction-heating from the outside surface only; this results in a shorter heat-treatment time and allows for compact equipment to be used. When the tempering includes induction-heating, the heating temperature may be in the range of 150–250° C. or in the range of 400–700° C. When the temperature is in the lower range of 150–250° C., the hardness obtained during quench-hardening is hardly decreased and a necessary wear resistance is ensured. When the temperature is in the higher range of 400–700° C., a good toughness can be ensured.

The workpiece may also be made from low-carbon steel or low-carbon low-alloy steel. The low-carbon low-alloy steel may be made from low-carbon boron steel containing 0.05–0.30% carbon by weight. When low-carbon boron steel is used, a good toughness is ensured.

If the workpiece is made from low-carbon steel or low-carbon low-alloy steel, the step of tempering may be entirely omitted. The elimination of this entire step is advantageous in that it reduces the overall time period required for heat treatment of the workpiece. The reason why the step of tempering can be eliminated is that when the workpiece is made from low-carbon steel or low-carbon low-alloy steel, the metal microstructure of the workpiece after quench-hardening is unchanged, and is maintained to be a low-carbon martensite microstructure even if tempering at a low temperature is conducted after quench-hardening.

DETAILED DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

A method for heat-treating a hollow cylindrical workpiece according to an embodiment of the present invention will be explained with reference to FIGS. 1–5.

Taking a bushing used for an endless track mounted to construction vehicles such as an excavator as an example of a hollow cylindrical workpiece, description will be made hereinafter. However, the hollow cylindrical workpiece is not limited to the bushing and may include other hollow cylindrical workpieces. In the case of the bushing used for the endless track mounted to the excavator, in order to prevent a wear at surfaces of the bushing, a hardness greater than about HRC (Rockwell Hardness) 52 is required at an inside surface and an outside surface of the bushing, and in order to ensure a necessary toughness, a hardness less than about HRC 40 is required at a core portion of a wall to ensure a necessary impact-proof strength. To obtain the aforementioned hardness by heat-treatment, the hollow cylindrical workpiece is made from carbon steel or carbon low-alloy steel.

The carbon steel may be selected from any one of low-carbon steel, medium-carbon steel and high-carbon steel. The low-carbon steel contains less than 0.30% carbon by weight, the medium-carbon steel contains equal to or more than 0.30% carbon by weight and equal to or less than 0.50% carbon by weight, and the high-carbon steel contains more than 0.50% carbon by weight. Carbon low-alloy steel is defined as a steel containing necessary alloy elements added to the carbon steel. Low-carbon low-alloy steel is defined as a steel containing necessary alloy elements added to the low-carbon steel, medium-carbon low-alloy steel is defined as a steel containing necessary alloy elements added to the medium-carbon steel, and high-carbon low-alloy steel is defined as a steel containing a necessary alloy elements added to the high-carbon steel. In the case of the medium-carbon steel, the medium-carbon low-alloy steel, the high-carbon steel, or the high-carbon low-alloy steel, tempering is conducted after quench-hardening including a first step and a second step. In the case of the low-carbon steel or the low-carbon low-alloy steel, tempering after quench-hardening including the first step and the second step may be conducted or may be omitted.

As a test sample, a hollow cylindrical workpiece was manufactured from a steel material of the medium-carbon low-alloy steel (more particularly, a medium-carbon boron steel), but the material should not be limited to the medium-carbon low-alloy steel. The workpiece had, for example, an outside diameter of 58.7 mm, an inside diameter of 37.3 mm, and a length of 144.8 mm. Further, the medium-carbon low-alloy steel used as the test example had the chemical composition of 0.39–0.41% carbon (C) by weight, 0.15–0.35% silicon (Si) by weight, 1.00–1.20% manganese (Mn) by weight, equal to or less than 0.025% phosphorus (P) by weight, equal to or less than 0.025% sulfur (S) by weight, equal to or less than 0.20% Nickel (Ni) by weight, equal to or less than 0.10–0.20% chromium (Cr), equal to or less than 0.30% copper (Cu) by weight, 0.015–0.070% aluminum (Al) by weight, 0.015–0.040% titanium (Ti) by weight, and 0.0005–0.0030% boron (B) by weight.

The method according to the embodiment of the present invention includes quench-hardening including a first step, and a second step conducted after the first step.

Figure 1:
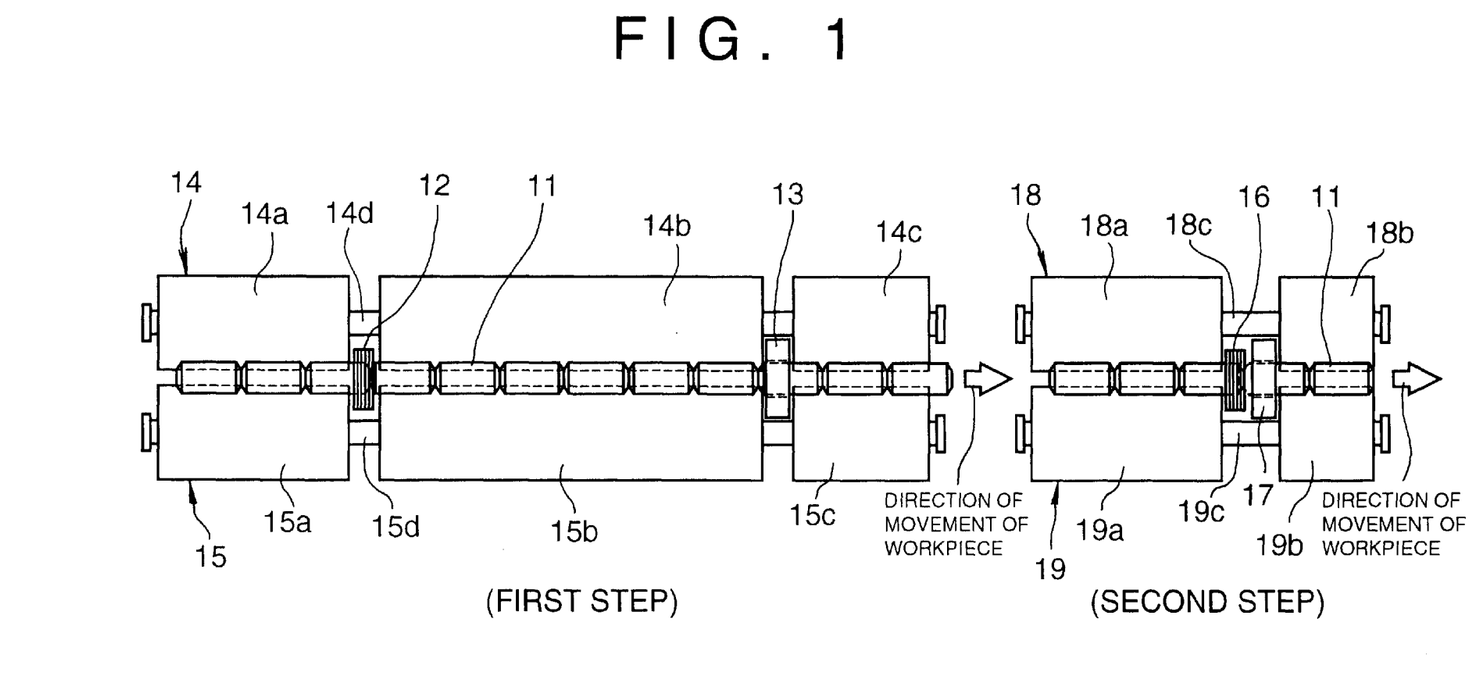
FIG. 1 is a plan view of an apparatus for conducting quench-hardening including a first step and a second step, of a method for heat-treating a hollow cylindrical workpiece according to an embodiment of the present invention.
Figure 2:
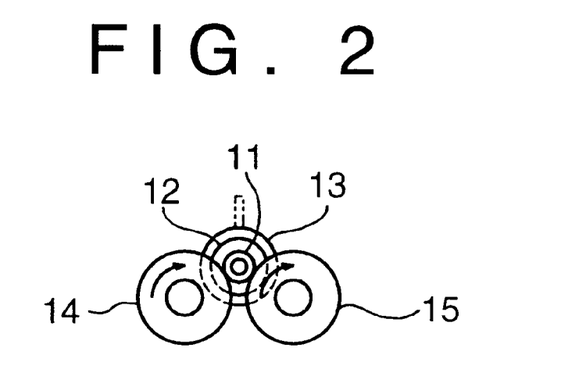
FIG. 2 is a front view of an apparatus for conducting the first step of the method according to the embodiment of the present invention.

In the first step, as illustrated in the first step of FIG. 1 and FIG. 2, a hollow cylindrical workpiece 11 is quench-hardened from an outside surface.

More particularly, while the hollow cylindrical workpiece 11 (hereinafter, a workpiece) which is rotated about its axis is continuously conveyed one after another in a horizontal direction without a space between adjacent workpieces, an entire cross-section of a wall of the workpiece 11 is subjected to induction-heating from the outside surface only to a temperature equal to or higher than an $Ac_3$ transformation temperature and equal to or less than a temperature 200° C. higher than the $Ac_3$ transformation temperature, and preferably, to a temperature 50° C. higher than the $Ac_3$ transformation temperature, at a heating portion (a heating coil 12). A frequency of an induction power source should be selected so that the entire cross-section of the wall is heated to the above-mentioned temperature. In this instance, the relationship between frequency f (kHz) and a heating depth d (mm) is expressed by the equation: $d=(250/f)^{1/2}$. The $Ac_3$ transformation temperature is determined by the chemical composition of the material, and is expressed by the following equation:

$$Ac_3(° C.)=908-224\times C(\%)+30\times Si(\%)-34=Mn(\%)+439\times P(\%)-23\times Ni(\%)$$

wherein, C: carbon, Si: silicon, Mn: manganese, P: phosphorus, Ni: Nickel

The reason why the workpiece 11 is continuously conveyed without a space between adjacent workpieces is to prevent heating energy from being taken by the tool for setting the workpiece due to removal of the tool, thereby to avoid a temporal stationary heating at an end portion in a longitudinal direction of the workpiece, which is required in the conventional methods. Due to this continuous heating, each workpiece can be heated uniformly in the longitudinal direction including the opposite end portions, so that a temperature difference caused in the longitudinal direction of the workpiece is effectively minimized. The reason why the workpiece 11 is conveyed in a horizontal direction is that if the workpiece 11 is continuously conveyed in a vertical direction, an apparatus will be necessarily too tall, which may cause inconvenience in its operation and a problem of an interference between the apparatus and a ceiling of a factory house in which the apparatus is installed. Conveying of the workpiece 11 is conducted as follows: The workpiece 11 is mounted on a pair of rotatory rollers 14 and 15 and is rotated about its axis by rotating rollers 14 and 15, one of which is slightly inclined downwardly with respect to a movement direction of the workpiece 11. The roller 14 is divided into a plurality of portions 14a, 14b, and 14c in the longitudinal direction, which are connected to each other by a shaft 14d so as to rotate integrally with each other. The roller 15 is divided into a plurality of portions 15a, 15b, and 15c in the longitudinal direction, which are connected to each other by a shaft 15d so as to rotate integrally with each other. The reason why the workpiece 11 is heated to a temperature equal to or above the $Ac_3$ transformation temperature is to austenitize a metal microstructure of the workpiece 11 for quench-hardening. The reason why an upper limit of a heating temperature is set at a temperature 200° C. higher than the $Ac_3$ transformation temperature, and preferably, at a temperature 50° C. higher than the $AC_3$ transformation temperature is to ensure a necessary toughness at the entirety of the workpiece 11 by maintaining a crystal grain in the martensite microstructure generated during quench-hardening to be fine, so that even if cracks are generated in the surface of the workpiece during use, propagation of cracks is effectively suppressed. If the workpiece 11 were heated to a temperature exceeding the temperature 200° C. higher than the $Ac_3$ transformation temperature, the crystal grain would become too coarse, thereby causing any crack generated in the surface during use to easily propagate to the entirety of the workpiece.

Then, by utilizing heat radiation and/or heat conduction of the workpiece during a time period of, for example, 30–50 seconds, required for moving the workpiece from the heating portion (the heating coil 12) to a cooling portion (a cooling jacket 13) spaced from the heating portion by about 0.6 m, the temperature of the workpiece 11 is made uniform in the longitudinal direction and in the thickness direction. With the lapse of time, the temperature of the workpiece is gradually lowered due to heat radiation of the workpiece 11.

Then, the workpiece 11 begins to be cooled at the cooling portion (by a coolant jetted out from the cooling jacket 13) before the temperature of the workpiece is lowered to an $Ar_3$ temperature. The workpiece 11 is cooled from the outside surface only and the entire cross-section of the wall of the workpiece 11 is quench-hardened. In this instance, since the entire cross-section of the wall is rapidly cooled from a temperature higher than the $Ar_3$ temperature, the workpiece 11 is quench-hardened through the entire cross-section of the wall.

Figure 5:
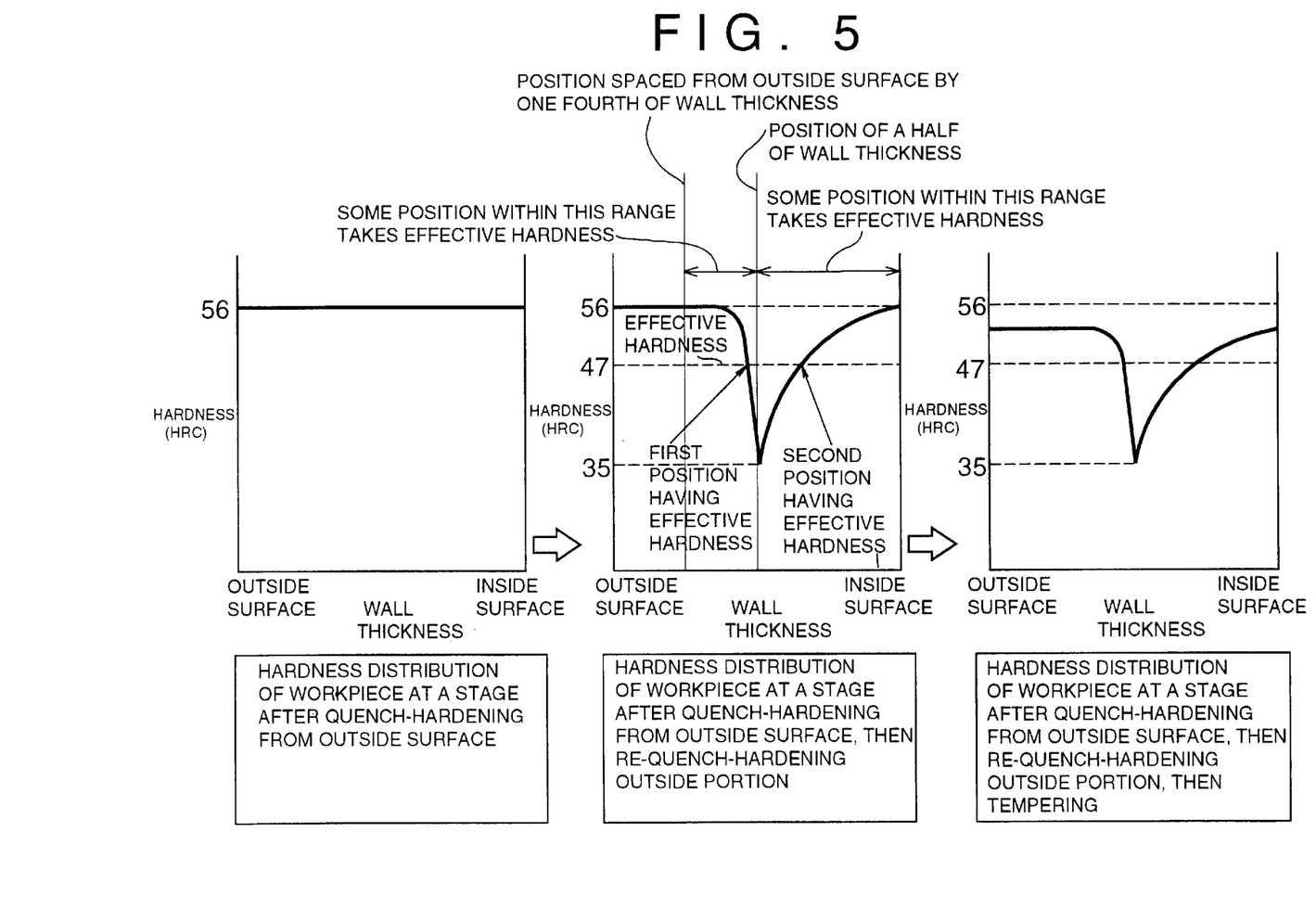
FIG. 5 is a graph illustrating a hardness distribution in the workpiece after each step has been conducted with the method according to the embodiment of the present invention.

As a result, as is evident from FIG. 5 illustrating a hardness distribution after quench-hardening from the outside surface, the entire cross-section of the wall of the workpiece 11 has a hardness of about HRC 56 and its metal microstructure is transformed into a martensite microstructure.

Then, in the second step, an outside portion of the workpiece 11 is re-quench-hardened.

Figure 3:
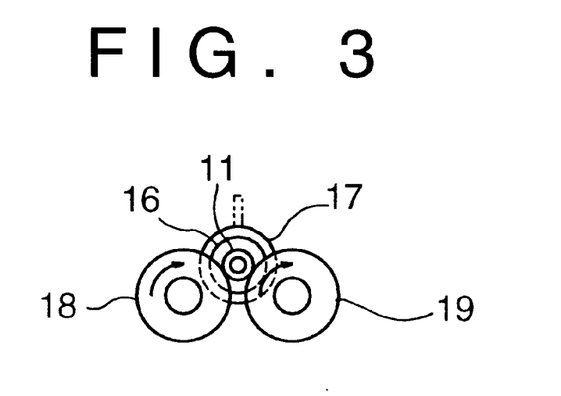
FIG. 3 is a front view of an apparatus for conducting the second step of the method according to the embodiment of the present invention.
Figure 4:
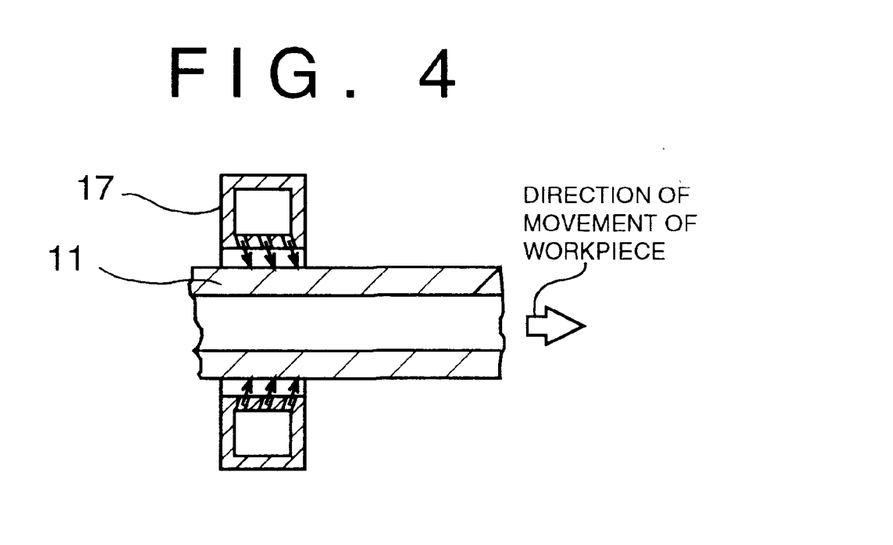
FIG. 4 is a cross-sectional view of a cooling portion in the second step of the method according to the embodiment of the present invention.

As illustrated in the second step of FIG. 1, FIG. 3 and FIG. 4, while the workpiece 11, which has been cooled to an ambient temperature after heating from the outside surface only and then cooling has been conducted, is continuously conveyed one after another in the horizontal direction without a space between adjacent workpieces and is rotated about the axis of the workpiece, only the outside portion of the workpiece is induction-heated to a temperature equal to or higher than the $Ac_3$, transformation temperature and equal to or lower than a temperature 200° C. higher than the Ac, transformation temperature, and preferably, equal to or lower than a temperature 50° C. higher than the $Ac_3$ transformation temperature. In the first step, the entire cross-section of the wall of the workpiece 11 is induction-heated to a temperature equal to or higher than the $Ac_3$ transformation temperature and equal to or lower than a temperature 200° C. higher than the $Ac_3$, transformation temperature, and preferably, equal to or lower than a temperature 50° C. higher than the $Ac_3$ transformation temperature. On the other hand, in the second step, induction-heating is conducted only to the outside portion defined as a portion between the outside surface and a position spaced from the outside surface by a distance greater than one fourth of a thickness of the wall of the workpiece and smaller than one half of a thickness of the wall of the workpiece. A heating depth during induction-heating is determined by selecting a frequency of the induction power source. In this instance, the relationship between frequency f (kHz) and the heating depth d (mm) is expressed by the equation: $d=(250/f)^{1/2}$.

In the second step, rotating the workpiece 11 and conveying the workpiece 11 in the horizontal direction are conducted by mounting workpiece 11 on a pair of rotatory rollers 18 and 19, one of which is slightly inclined downwardly with respect to a movement direction of the workpiece. The roller 18 is divided into a plurality of portions 18a and 18b in the longitudinal direction, which are connected to each other by a shaft 18c so as to rotate integrally with each other. The roller 19 is divided into a plurality of portions 19a and 19b in the longitudinal direction, which are connected to each other by a shaft 19c so as to rotate integrally with each other. The reason why the upper limit of a heating temperature is set at a temperature 200° C. higher than the $Ac_3$ transformation temperature, and preferably, at a temperature 50° C. higher than $Ac_3$ transformation temperature is to maintain a crystal grain in the martensite microstructure at an outside portion of the workpiece generated during re-quench-hardening to be fine, so that cracks are effectively prevented from being generated during use, or even if cracks are generated, the cracks are hardly propagated.

Immediately after the heating from the outside surface (within a time period shorter than 3 seconds, and preferably, shorter than 2 seconds, and more preferably, shorter than one second after heating is over), that is, while the outside portion of the workpiece 11 is at a temperature above the $Ac_3$ transformation temperature, the core portion of the wall is at a temperature 400°–700° C. (a high-temperature tempering temperature), and the inside portion is at a temperature lower than a low-temperature tempering temperature (i.e., before the heat energy is conducted from the outside portion to the inside portion so that a temperature of the inside portion reaches the low-temperature tempering temperature), the workpiece 11 is cooled by the coolant jetted out from the cooling jacket 17 from the outside surface only. Due to this cooling from the outside surface only, the workpiece 11 has an effective hardness at a first position located within the outside portion of the workpiece 11 which is defined as a portion located between the outside surface and a position spaced from the outside surface by a distance greater than one fourth of a thickness of the wall and less than one half of a thickness of the wall, a portion located between the first position having the effective hardness and the outside surface has a hardness greater than the effective hardness, and a portion located closer to the core portion than the first position having the effective hardness has a hardness less than the effective hardness. The workpiece 11 has an effective hardness at a second position located within the inside portion of the workpiece 11 which is defined as a portion located between the inside surface of the workpiece 11 and a position spaced from the inside surface by a distance less than one half of the thickness of the wall has the effective hardness, a portion located between the second position having the effective hardness and the inside surface has a hardness greater than the effective hardness, and a portion located closer to the core portion of the wall than the second position having the effective hardness has a hardness less than the effective hardness. That is, the core portion of the wall which is defined as a portion between the outside portion and the inside portion of the workpiece 11 is high-temperature tempered. In this instance, the effective hardness means a hardness of the workpiece which is in a condition where 80% of the entire metal microstructure of the workpiece 11 is transformed into martensite microstructure. The effective hardness is determined by the carbon content of the workpiece. With the embodiment of the present invention, the carbon content of the workpiece 11 is 0.40% and the effective hardness is HRC 47. The hardness at the inside portion of the workpiece 11 gradually decreases from the inside surface toward the core portion of the wall. Since the inside portion of the workpiece 11 is not subjected to heating and cooling, neither the heating coil nor the water jacket needs to be inserted within the inside surface of the workpiece, so that the handling apparatus is unnecessary to be provided.

As is evident from FIG. 5 illustrating a hardness distribution after re-quench-hardening the outside portion, the outside portion has a hardness of about HRC 56 by re-quench-hardening the outside portion. Further, during re-quench-hardening the outside portion, the core portion, which has been heated to a temperature of 400°–700° C. during beating, is tempered at a high temperature and its metal microstructure is transformed into a sorbite microstructure having a hardness of about HRC30–40, so that a necessary toughness is ensured to prevent cracks.

Further, during re-quench-hardening the outside portion, since the inside portion is cooled by cooling the workpiece from the outside surface only, the inside portion is cooled more slowly, compared with a case where the inside portion is cooled directly from the inside surface, so that deformation due to cooling (mainly generated in the longitudinal direction of the workpiece) is effectively suppressed, resulting that the magnitude of deviation in the dimension of the outside diameter is decreased compared with that in the conventional heat-treatment method.

In a case where the material of the workpiece 11 is selected from any one of medium-carbon steel, medium-carbon low alloy steel, high-carbon steel, and high-carbon low-alloy steel, the workpiece 11 is tempered after the outside portion and the inside portion have been quench-hardened and the core portion has been quench-hardened and then high-temperature tempered due to quench-hardening including the first step and the second step. In a case where the material of the workpiece 11 is selected from any one of the low-carbon steel and the low-carbon low-alloy steel, the above tempering may be conducted, or may be omitted.

Heating during tempering is conducted by heating the workpiece within a furnace, or by induction-heating the workpiece from the outside surface of the workpiece only. In the case of heating within a furnace, uniform heating through the entire cross-section of the wall of the workpiece is easily realized. In the case of the induction-heating, heating time is shortened and downsizing the equipment can be achieved.

Tempering by heating the workpiece within a furnace may be a low-temperature tempering conducted at a temperature of 150°–250° C. or a high-temperature tempering conducted at a temperature of 400°–700° C., which may be selected depending on quality requirements of the hollow cylindrical workpiece. In the case of low-temperature tempering, the hardness obtained during quench-hardening is hardly decreased, and a necessary wear resistance is ensured. In the case of high-temperature tempering, a good toughness is ensured.

Tempering by induction-heating the workpiece may be a low-temperature tempering conducted at a temperature of 150°–250° C. or a high-temperature tempering conducted at a temperature of 400°–700° C., which may be selected depending on the quality requirements of the hollow cylindrical workpiece. In low-temperature tempering, the hardness obtained during quench-hardening is hardly decreased, and a necessary wear resistance is ensured. In the case of high-temperature tempering, a good toughness is ensured.

In a case where the workpiece 11 is made from low-carbon steel or low-carbon low-alloy steel, tempering conducted after quench-hardening including the first step and the second step may be omitted, because with the low-carbon steel or the low-carbon low-alloy steel, the metal microstructure is unchanged and is maintained to be a low-carbon martensite microstructure even if tempering is conducted after quench-hardening.

In the test, since the workpiece 11 made from the medium-carbon low-alloy steel was used as the test sample, the workpiece 11 was tempered after the outside portion and the inside portion had been quench-hardened and the core portion had been quench-hardened and then tempered at a high temperature. Tempering was a low-temperature tempering tempered at a temperature equal to or lower than about 200° C. The tempering was conducted in batch process (about 2.5 Hr) by heating within a furnace. Due to the low-temperature tempering, the martensite microstructure obtained during the first and the second steps at the outside portion and at the inside portion was almost unchanged, and the hardness at the outside portion and the hardness at the inside portion were maintained (see a hardness distribution at the stage of quench-hardening of the outside portion→re-quench-hardening of the outside portion tempering, of FIG. 5). The hardness at the stage after the tempering was about HRC 52 or greater.

Further, crush test was conducted and comparison was made between a conventional product heat-treated according to the method of Japanese Patent Publication SHO 59-77979 and a product heat-treated according to the above-described method of the present invention. Five test pieces were provided for the conventional product and the product heat-treated according to the method of the present invention, respectively. Table 1 shows the test results, crush loads at which the test pieces were crushed. As is evident from Table 1, the average values of the crush loads are the same with the conventional product and the product heat-treated according to the method of the present invention, which means that the product heat-treated according to the method of the present invention had a crush load equivalent to that of the conventional product. Accordingly, with the method of the present invention, productivity can be improved, while the strength is maintained at the same level at that of the conventional product.

TABLE 1

| Test Piece No. | Conventional Product Crush Load (kN) | Present Invention Crush Load (kN) |
|---|---|---|
| 1 | 274 | 275 |
| 2 | 275 | 276 |
| 3 | 272 | 278 |
| 4 | 275 | 275 |

TABLE 1-continued

| Test Piece No. | Conventional Product Crush Load (kN) | Present Invention Crush Load (kN) |
| --- | --- | --- |
| 5 | 279 | 271 |
| Average | 275 | 275 |

The aforementioned description has been made taking a bushing for an endless track as an example for a hollow cylindrical workpiece 11, but it is to be understood that the workpiece 11 is not limited to a bushing for the endless track and the present invention may include general hollow cylindrical workpieces.

According to the present invention, the following technical advantages are obtained:

First, since the workpiece is conveyed in the horizontal direction in the first step, like in the first step of the method as disclosed in Japanese Patent Publication No. HEI 9-143564, a continuous heat-treatment is possible. Further, in the second step, due to heating from the outside surface only and cooling from the outside surface only, neither a heating coil nor a water jacket needs to be inserted within the inside surface of the workpiece. As a result, a continuous heat-treatment conducted in the integrated line is possible, thereby to improve productivity. Furthermore, since the workpiece is continuously conveyed without a space between adjacent workpieces, heat energy does not escape to the tool for supporting the workpiece thereby causing the workpiece to be heated uniformly in the longitudinal direction, compared with the conventional methods in which quench-hardening is conducted using the tool for supporting the workpiece. Accordingly, deformation in the longitudinal direction of the workpiece, which was caused in the conventional methods, is greatly decreased thereby improving accuracy in the dimension of the workpiece. In addition, the product heat-treated according to the method of the present invention has a deeper effective quench-hardened layer at outer portion than the conventional product, thereby improving wear resistance compared with the product heat-treated according to the conventional method.

Second, in the case where the workpiece is tempered, though a hardness at a workpiece surface is decreased, a toughness at the entirety of the workpiece is increased, so that the workpiece may be put to a practical use.

Third, in the case where tempering is conducted by heating a workpiece within a furnace, the entire cross-section of the wall of the workpiece can be heated to a uniform temperature.

Fourth, in the case where tempering is conducted by heating a workpiece within a furnace at a low temperature of 150°–250° C., the hardness obtained during quench-hardening is hardly decreased and a necessary wear resistance is ensured.

Fifth, in the case where tempering is conducted by heating a workpiece within a furnace at a high temperature of 400°–700° C., a good toughness can be ensured.

Sixth, in the case where tempering is conducted by induction-heating the workpiece from an outside surface only, a shorter heat-treatment time and a compact equipment can be realized.

Seventh, in the case where tempering is conducted by induction-heating a workpiece at a low temperature of 150°–250° C., the hardness obtained during quench-hardening is hardly decreased and a necessary wear resistance is ensured.

Eighth, in the case where tempering is conducted by induction-heating a workpiece at a high temperature of 400°–700° C., a good toughness can be ensured.

Ninth, in the case where the workpiece is made from low-carbon steel or low-carbon low-alloy steel, since tempering conducted after quench-hardening is omitted, a total heat-treatment time period is shortened.

Tenth, in the case where the workpiece is made from low-carbon born steel containing 0.05–0.30% carbon by weight, a necessary toughness is ensured in addition to the advantage as discussed above.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A method of quench-hardening a hollow cylindrical workpiece, said workpiece having an outside surface and an inside surface defining a wall therebetween, said wall having an outside portion defined between said outside surface and a position spaced from said outside surface by a distance greater than one fourth of a thickness of said wall and less than one half of a thickness of said wall, an inside portion defined between said inside surface and a position spaced from said inside surface by a distance less than one half of a thickness of said wall, and a core portion defined between said outside portion and said inside portion, said method comprising:

first:
conveying a workpiece one after another in a substantially horizontal direction without a space between adjacent workpieces,
induction-heating at a heating portion an entire cross-section of said wall of said workpiece simultaneously with said conveying to a temperature equal to or higher than an $Ac_3$ transformation temperature and equal to or lower than a temperature 200° C. higher than said $Ac_3$ transformation temperature from said outside surface of said workpiece only,
making a temperature of said workpiece substantially uniform in a longitudinal direction and in a thickness direction of said workpiece by utilizing a time period required for moving said workpiece to a cooling portion spaced from said heating portion, and
cooling said workpiece from said outside surface only, so that the entire cross-section of said wall of said workpiece is quench-hardened, said cooling being initiated before the temperature of said workpiece falls to an $Ar_3$ temperature; and second:
conveying said workpiece one after another, the entire cross-section of said wall of which has been quench-hardened, without a space between adjacent workpieces in a horizontal direction,
induction-heating said outside portion of said wall of said workpiece only simultaneously with said conveying to a temperature equal to or higher than said $Ac_3$ transformation temperature and equal to or lower than a temperature 200° C. higher than said $Ac_3$, transformation temperature from said outside surface of said workpiece only, and
cooling said workpiece immediately after said heating from said outside surface of said workpiece only, so that said workpiece has an effective hardness at a first position located within said outside portion, a portion located between said first position having the effective hardness and said outside surface has a hardness greater than the effective hardness, and a portion located closer to said core portion than said first position having the effective hardness has a hardness less than the effective hardness, while said workpiece has the effective hardness at a second position located within said inside portion, a portion between said second position having the effective hardness and said inside surface has a hardness greater than the effective hardness, and a portion located closer to said core portion than said second position having the effective hardness has a hardness less than the effective hardness.

2. A method according to claim 1, wherein said workpiece is made from at least one of carbon steel and carbon low-alloy steel, and said method further comprises tempering, conducted after said second conveying, heating and cooling.

3. A method according to claim 2, wherein said tempering includes heating within a furnace.

4. A method according to claim 3, wherein a heating temperature during said heating within the furnace is in the range of 150°–250° C.

5. A method according to claim 3, wherein a heating temperature during said heating within the furnace is in the range of 400°–700° C.

6. A method according to claim 2, wherein said tempering includes induction-heating conducted from said outside surface of said workpiece only.

7. A method according to claim 6, wherein a heating temperature during said induction-heating is in the range of 150°–250° C.

8. A method according to claim 6, wherein a heating temperature during said induction-heating is in the range of 400°–700° C.

9. A method according to claim 1, wherein said workpiece is made from at least one of low-carbon steel and low-carbon low-alloy steel, and no tempering is conducted after said second conveying, heating and cooling.

10. A method according to claim 9, wherein said low-carbon low-alloy steel is made from low-carbon boron steel containing 0.05–0.30% carbon by weight.

* * * * *